US010482053B2

(12) United States Patent
Ohnuma

(10) Patent No.: US 10,482,053 B2
(45) Date of Patent: Nov. 19, 2019

(54) INFORMATION PROCESSING APPARATUS WITH CONNECTION TERMINAL FOR CONNECTING TO ELECTRONIC DEVICES HAVING DIFFERENT FUNCTIONS

(71) Applicant: SHARP KABUSHIKI KAISHA, Sakai, Osaka (JP)

(72) Inventor: Atsushi Ohnuma, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/215,257

(22) Filed: Dec. 10, 2018

(65) Prior Publication Data
US 2019/0179789 A1  Jun. 13, 2019

(30) Foreign Application Priority Data
Dec. 13, 2017  (JP) .................................. 2017-238933

(51) Int. Cl.
*G06F 3/00* (2006.01)
*G06F 13/40* (2006.01)
*G06F 13/16* (2006.01)

(52) U.S. Cl.
CPC ...... *G06F 13/4081* (2013.01); *G06F 13/1668* (2013.01); *G06F 13/4045* (2013.01)

(58) Field of Classification Search
CPC ............. G06F 13/4081; G06F 13/1668; G06F 13/4045
See application file for complete search history.

(56) References Cited

U.S. PATENT DOCUMENTS

| | | | | | |
|---|---|---|---|---|---|
| 5,737,571 | A | * | 4/1998 | Fukuzumi | ........... G06F 12/1466 710/13 |
| 5,909,596 | A | * | 6/1999 | Mizuta | ................ G06F 13/4081 710/104 |
| 6,044,423 | A | * | 3/2000 | Seo | ........................ G06F 9/4411 710/302 |

(Continued)

FOREIGN PATENT DOCUMENTS

| | | |
|---|---|---|
| JP | H11-110332 A | 4/1999 |
| JP | 2001-236302 A | 8/2001 |
| JP | 2014-119979 A | 6/2014 |

*Primary Examiner* — Jing-Yih Shyu
(74) *Attorney, Agent, or Firm* — ScienBiziP, P.C.

(57) ABSTRACT

An information processing apparatus includes a basic control module and a function extension module. The function extension module includes a storage unit in which extension setting information for enabling the basic control module to control the function extension module to execute a function is stored in advance, and a setting information transmission unit that transmits the extension setting information to the basic control module. The basic control module includes a setting information acquisition unit that acquires extension setting information, a variable path setting unit that sets, based on the acquired extension setting information, a variable connection path via which to transfer information for controlling the function extension module, and an extension function execution unit that transfers the information for controlling the function extension module via the set variable connection path using the acquired extension setting information and to control the function extension module to execute the function.

8 Claims, 8 Drawing Sheets

(56) References Cited

U.S. PATENT DOCUMENTS

| | | | | |
|---|---|---|---|---|
| 6,339,831 B1 * | 1/2002 | Sugawara | ............ | G06F 13/4077 |
| | | | | 710/9 |
| 6,654,840 B1 * | 11/2003 | Gendo | .................... | H01R 29/00 |
| | | | | 710/300 |
| 7,721,017 B2 * | 5/2010 | Estakhri | .............. | G06F 13/4081 |
| | | | | 710/105 |
| 8,909,821 B2 * | 12/2014 | Li | ......................... | G06F 11/006 |
| | | | | 710/10 |
| 2014/0173142 A1 | 6/2014 | Li | | |

* cited by examiner

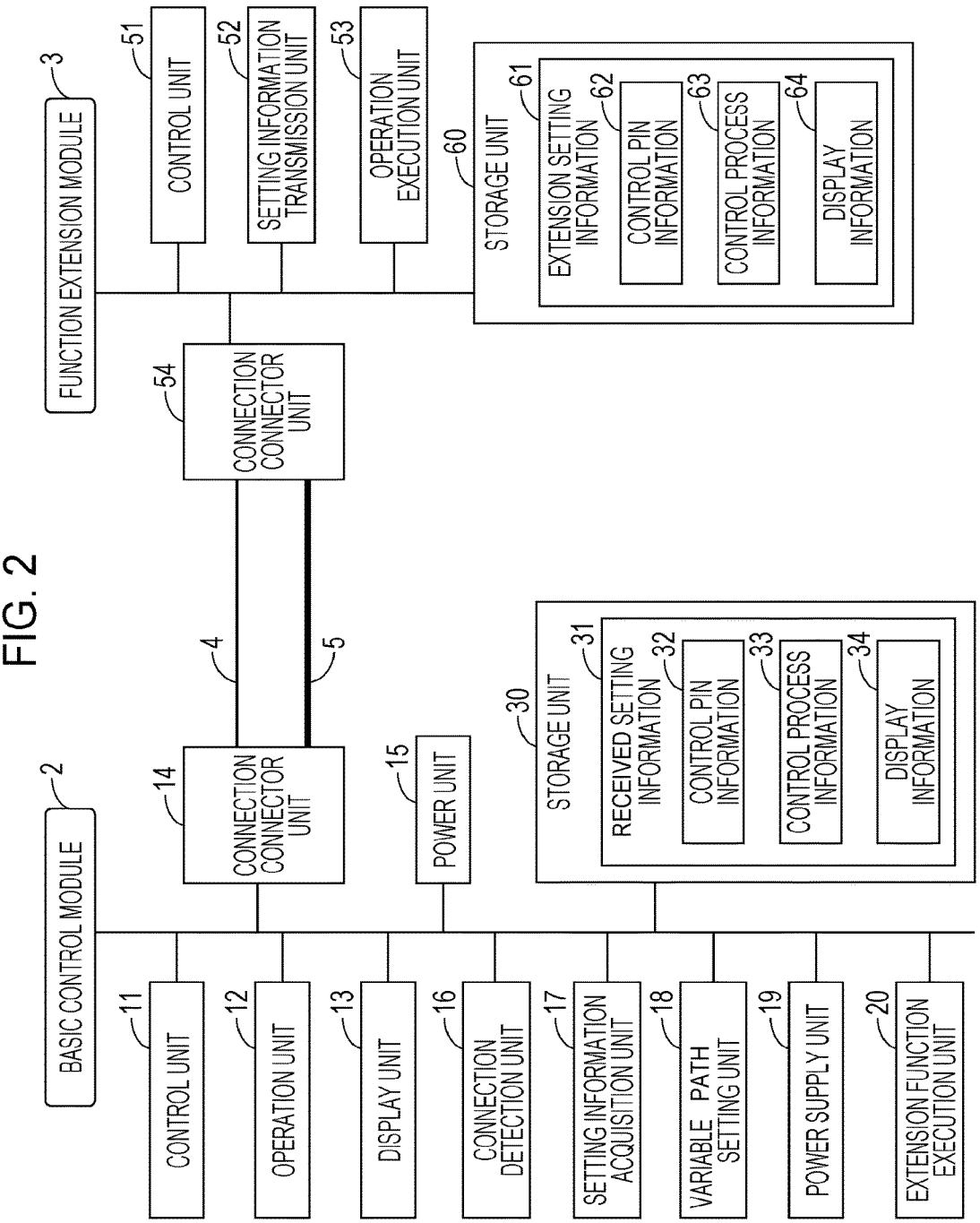

FIG. 3A

| | |
|---|---|
| TERMINAL NUMBER OF VARIABLE CONNECTION TERMINAL: | 2, 3, 4, 5, 6 |
| TERMINAL NUMBER OF FIXED CONNECTION TERMINAL: | 1, 7, 8, 9, 10 |

FIG. 3B

| TERMINAL NUMBER | FUNCTION | CHANGING OF SETTING IS POSSIBLE OR NOT | INPUT/OUTPUT DIRECTION | VOLTAGE LEVEL (V) | GPIO LOGIC | GPIO SIGNAL TYPE |
|---|---|---|---|---|---|---|
| 1 | POWER | – | – | – | – | – |
| 2 | RESET (GPIO) | ○ | IN | 3.3 | NEGATIVE | LEVEL |
| 3 | ON (GPIO) | ○ | IN | 3.3 | NEGATIVE | PULSE |
| 4 | ON COMPLETION (GPIO) | ○ | OUT | 3.3 | POSITIVE | LEVEL |
| 5 | UART | ○ | IN | 5 | – | – |
| 6 | UART | ○ | OUT | 5 | – | – |
| 7 | I2C Data | – | IN/OUT | – | – | – |
| 8 | I2C Clock | – | IN | – | – | – |
| 9 | I2C POWER | – | IN | – | – | – |
| 10 | GND | – | – | – | – | – |

FIG. 3C

| TERMINAL NUMBER | FUNCTION | CHANGING OF SETTING IS POSSIBLE OR NOT | INPUT/OUTPUT DIRECTION | VOLTAGE LEVEL (V) | GPIO LOGIC | GPIO SIGNAL TYPE |
|---|---|---|---|---|---|---|
| 1 | POWER | – | – | – | – | – |
| 2 | OFF (GPIO) | ○ | IN | 3.3 | NEGATIVE | LEVEL |
| 3 | ON (GPIO) | ○ | IN | 3.3 | NEGATIVE | LEVEL |
| 4 | ERROR STATE (GPIO) | ○ | OUT | 3.3 | NEGATIVE | LEVEL |
| 5 | I2C Data2 | ○ | IN/OUT | 3.3 | – | – |
| 6 | I2C Clock2 | ○ | IN | 3.3 | – | – |
| 7 | I2C Data | – | IN/OUT | – | – | – |
| 8 |  | – | IN | – | – | – |
| 9 | I2C POWER | – | IN | – | – | – |
| 10 | GND | – | – | – | – | – |

FIG. 4A

| COMMAND NAME | CONTROL COMMAND #1 | CONTROL COMMAND #2 | CONTROL COMMAND #3 | CONTROL COMMAND #4 |
|---|---|---|---|---|
| | POWER ON | RECOVER FROM ABNORMALITY | CHANGE OPERATION MODE | POWER OFF |
| PROCESS | TURN ON POWER | ASSERT RESET TERMINAL | SET UART TERMINAL (IN/OUT) TO 19200 bps | ASSERT RESET TERMINAL |
| | WAIT FOR 100 ms | WAIT FOR 10 ms | TRANSMIT COMMAND 0xEE TO UART TERMINAL IN | WAIT FOR 10 ms |
| | NEGATE RESET TERMINAL | NEGATE RESET TERMINAL | CONFIRM THAT COMMAND 0x55 IS RECEIVED BY UART TERMINAL OUT | TURN OFF MAIN POWER |

FIG. 4B

| COMMAND NAME | CONTROL COMMAND #1 | CONTROL COMMAND #2 | CONTROL COMMAND #3 | CONTROL COMMAND #4 |
|---|---|---|---|---|
| | POWER ON | RECOVER FROM ABNORMALITY | CHANGE OPERATION MODE | POWER OFF |
| PROCESS | TURN ON POWER | TURN OFF POWER | SET I2C Data/Clock2 TERMINAL TO 400 kHz | SET I2C Data/Clock2 TERMINAL TO 400 kHz |
| | WAIT FOR 1000 ms | WAIT FOR 1000 ms | TRANSMIT COMMAND 0x35 0x20 0x02 TO I2C Data2 TERMINAL | TRANSMIT COMMAND 0x35 0x20 0x03 TO I2C Data2 TERMINAL |
| | SET I2C Data/Clock2 TERMINAL TO 400 kHz | TURN ON POWER | CONFIRM THAT COMMAND 0xee IS RECEIVED IN RESPONSE TO I2C Data2 TERMINAL | CONFIRM THAT COMMAND 0xee IS RECEIVED IN RESPONSE TO I2C Data2 TERMINAL |
| | TRANSMIT COMMAND 0x35 0x20 0x01 TO I2C Data2 TERMINAL | | | WAIT FOR 1000 ms |
| | CONFIRM THAT COMMAND 0xee IS RECEIVED IN RESPONSE TO I2C Data2 TERMINAL | | | TURN OFF POWER |

FIG. 4C

| ITEM NAME | | CORRESPONDING COMMAND |
|---|---|---|
| Power Control | | POWER ON |
| | Reset | RECOVER FROM ABNORMALITY |

# INFORMATION PROCESSING APPARATUS WITH CONNECTION TERMINAL FOR CONNECTING TO ELECTRONIC DEVICES HAVING DIFFERENT FUNCTIONS

BACKGROUND

1. Field

The present disclosure relates to an information processing apparatus, and more particularly, to an information processing apparatus including a connection terminal capable of being connected to various kinds of electronic devices having different functions.

2. Description of the Related Art

Various information processing apparatuses such as personal computers, display apparatuses, and the like are used. Some information processing apparatuses include a connection terminal (an extension connector) such that an electronic device (an optional device) or an electronic circuit board is allowed to be connected to the connection terminal to realize an additional function. For example, a program for controlling an operation of an optional device to be connected to the information processing apparatus is stored in advance in a storage apparatus of the information processing apparatus, and, after the optional device is connected to the extension connector of the information processing apparatus, the program is started in the information processing apparatus to operate the optional device.

Japanese Unexamined Patent Application Publication No. 2014-119979 discloses an electronic apparatus configured such that a function extension apparatus having a slimline connector according to the SATA standard is connected to the electronic apparatus via the slimline connector of the electronic apparatus, and the type of the function extension apparatus is detected based on a state of a detection signal input to a particular pin of the connector.

Japanese Unexamined Patent Application Publication No. 11-110332 discloses an automatic detection apparatus including a plurality of connectors respectively connectable to a plurality of subsystems (external devices) wherein each connector includes a control pin and three identification pins such that when a subsystem is connected to a connector, the subsystem is identified based on a combination of connection and disconnection states of the control pin and the three identification pins.

Japanese Unexamined Patent Application Publication No. 2001-236302 discloses an information processing apparatus configured such that when an external peripheral device is connected via a connector, the connection is detected by receiving an output signal from the external peripheral device, and a request for device information is sent to the external peripheral device. A device type is detected from the device information acquired from the external peripheral device, and an information file for operating the external peripheral device is read out from a RAM, and the information file is updated and application software for executing a specific process to use the external peripheral device is started.

However, in conventional information processing apparatuses, in a case where optional devices to be connected are different in specifications in terms of functions, control methods, connection pins, and/or the like, optional devices are controlled differently depending on the optional devices. To this end, programs for achieving the different controls are stored in advance in the information processing apparatus. To make it possible to selectively connect any one of a plurality of different optional devices, a plurality of programs for controlling the respective different optional devices are stored in advance in the information processing apparatus. In any case, a storage apparatus with a large capacity size for storing the programs is prepared in the information processing apparatus or an existing storage apparatus is replaced with a storage apparatus with a large capacity size.

To make it possible to connect a new additional optional device, the program installed in the information processing apparatus is modified or replaced with a newly developed program for controlling the optional device.

In particular, in the apparatuses disclosed in Japanese Unexamined Patent Application Publication No. 2014-119979 and Japanese Unexamined Patent Application Publication No. 11-110332, one of a plurality of external devices is selectively connectable to an information processing apparatus, and the type of an external device connected to the information processing apparatus is automatically detected when the external device is connected to the connector of the information processing apparatus. However, to operate the connected external device, a specific control program for controlling the external device is newly developed and the developed control program is stored in advance in the information processing apparatus.

In the information processing apparatus disclosed in Japanese Unexamined Patent Application Publication No. 2001-236302, an information file for operating an external peripheral device to be connected is stored in advance in the RAM of the information processing apparatus, and furthermore, application software for executing a specific process to use the external peripheral device is also stored in advance in the information processing apparatus.

That is, in each conventional information processing apparatus, although a wide variety of types of optional devices are selectively connectable, programs for controlling the respective optional devices are developed and stored in a storage apparatus of the information processing apparatus, and thus a storage capacity large enough to store the programs are allocated in advance in the storage apparatus. That is, new hardware and/or new software for use in the information processing apparatus are developed and produced, and thus considerable amounts of time and cost are spent to make a plurality of optional devices usable.

In view of the above, the present disclosure provides an information processing apparatus configured such that when a new additional optional device or the like is connected to the information processing apparatus, its new function can be used without newly developing a program for controlling the optional device or the like and installing it in advance in the information processing apparatus, and thus suppressing a developing cost to make the optional device or the like operable thereby easily enabling it to use a function of the optional device or the like simply by connecting the optional device to the information processing apparatus.

SUMMARY

In an aspect, the present disclosure provides an information processing apparatus including a basic control module and a function extension module, the function extension module including a storage unit in which extension setting information for enabling the basic control module to control the function extension module to execute a function of the function extension module is stored in advance, and a setting information transmission unit configured to transmit the extension setting information to the basic control module, the basic control module including a setting information acquisition unit configured to acquire the extension setting information transmitted by the setting information transmission unit of the function extension module, a variable path setting unit configured to set, based on the acquired extension setting information, a variable connection path via which to transfer information for controlling the function extension module, and an extension function execution unit configured to transfer the information for controlling the function extension module via the set variable connection path using the acquired extension setting information and to control the function extension module to execute a particular function.

In an aspect, the present disclosure provides a method of extending a function of an information processing apparatus including a basic control module and a function extension module, the method including, previously storing, in the function extension module, extension setting information for enabling the basic control module to execute a function of the function extension module, in a case where the basic control module and the function extension module are connected to each other, transmitting the stored extension setting information to the basic control module, acquiring the transmitted extension setting information to the basic control module, based on the acquired extension setting information, setting variable connection path via which to transfer information for controlling the function extension module, and transferring the information for controlling the function extension module via the set variable connection path using the acquired extension setting information and making the function extension module execute a particular function.

BRIEF DESCRIPTION OF THE DRAWINGS

FIG. 2 is a block diagram illustrating a configuration of an information processing apparatus according to an embodiment of the present disclosure;

FIGS. 3A to 3C are diagrams each illustrating an example of information stored in a storage unit of an extension function module according to an embodiment of the present disclosure;

FIGS. 4A to 4C are diagrams each illustrating an example of information stored in a storage unit of an extension function module according to an embodiment of the present disclosure.

DESCRIPTION OF THE EMBODIMENTS

Figure 1A:
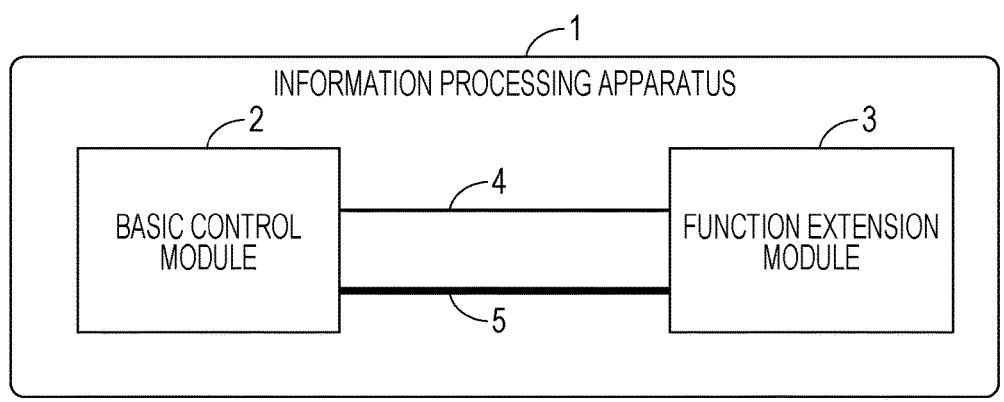
FIGS. 1A and 1B are schematic diagrams illustrating a configuration of an information processing apparatus according to an embodiment of the present disclosure.
Figure 1B:
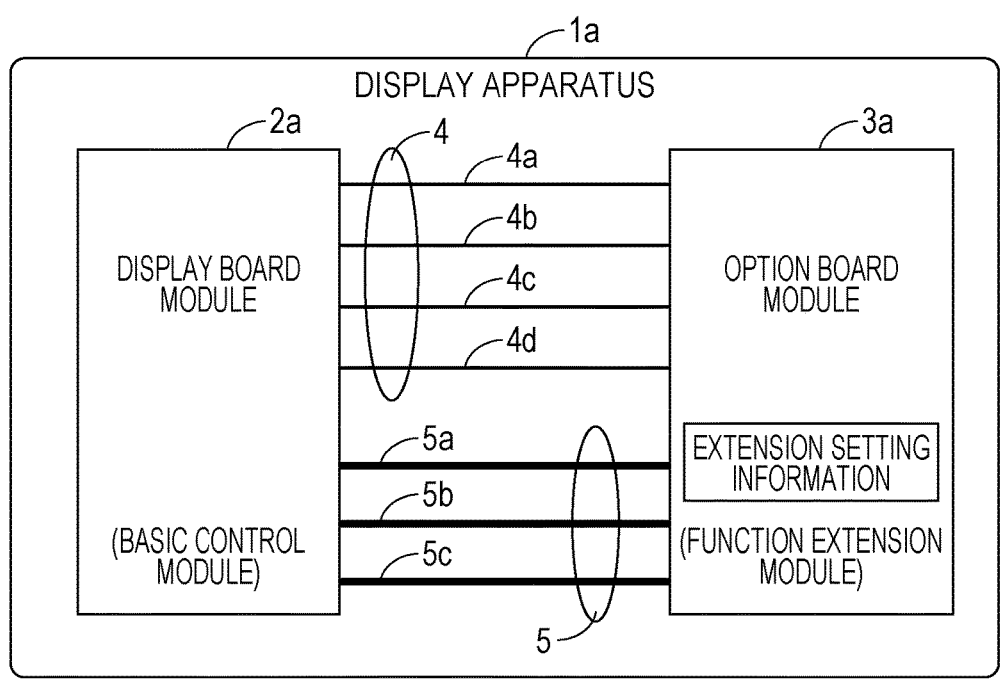

Embodiments of the present disclosure are described below with reference to drawings. Note that the embodiments described below are merely examples, and the present disclosure is not limited to those embodiments. Configuration of information processing apparatus FIGS. 1A and 1B are schematic diagrams each illustrating a configuration of an information processing apparatus according to an embodiment of the present disclosure. As shown in FIG. 1A, an information processing apparatus 1 according to the embodiment of the present disclosure includes a basic control module 2 and a function extension module 3.

The basic control module 2 is a control apparatus or a control circuit board that executes a function implemented on the information processing apparatus 1. The function extension module 3 is a control apparatus or a control circuit board that executes an additional function added to the information processing apparatus 1, and the function extension module 3 may also referred to as an optional board module. The basic control module 2 and the function extension module 3 are connected to each other via a variable connection path 4 and a fixed connection path 5.

The basic control module 2 includes a connection connector having a plurality of connection terminals provided in advance in order to make it possible to add, later, the function extension module 3 to the basic control module 2. The function extension module 3 includes a connection connector including a plurality of connection terminals capable of being connected to the connection connector of the basic control module 2.

The basic control module 2 and the function extension module 3 may be connected by directly fitting the connection connectors thereof, or by connecting the connection connectors thereof via a short connection cable. The plurality of connection terminals via which the basic control module 2 and the function extension module 3 are connected to each other are classified into two types: fixed connection terminals (also referred to as fixed pins) whose roles are fixedly predetermined; and variable connection terminals (also referred to as variable pins) whose roles are not determined in the basic control module 2.

Each variable connection terminal of the function extension module 3 may have a predetermined fixed role, while the fixed role may be different from one function extension module 3 to another. The role of each variable connection terminal of the basic control module 2 can be changed in many ways. When the function extension module 3 is connected, the basic control module 2 acquires extension setting information specific to the function extension module 3 such as that described later, and the roles of the variable connection terminals, at respective locations, of the basic control module 2 are set to be the same as the roles of the variable connection terminals, at respective corresponding locations, of the connected function extension module 3.

That is, it is allowed to define the roles of the variable connection terminals differently for each of the function extension modules 3. The function of each function extension module 3 to be executed may be different among function extension modules 3 as long as the function extension module 3 has a connection connector having the same shape and having the same number of terminals as those of the connection connector of the basic control module 2 such that the function extension module 3 is allowed to be physically connected to the basic control module 2. The basic control module 2 and the function extension module 3 are connected to each other such that the corresponding variable connection terminals of the connection connectors of the two modules are connected to each other, and the corresponding fixed connection terminals of the two modules are connected to each other. A connection path via which the variable connection terminals of the basic control module 2 and the function extension module 3 are connected to each other is referred to as a variable connection path 4, while a connection path via which the fixed connection terminals of the basic control module 2 and the function extension module 3 are connected to each other is referred to as a fixed connection path 5.

The fixed connection path 5 includes, for example, a power line and a GND line for supplying power from the basic control module 2 to the function extension module 3, a GND line, and a data line for bidirectionally transferring data. The power line, the GND line, and the data line are connected to fixed connection terminals, at predetermined locations, of both the basic control module 2 and the function extension module 3. The fixed connection terminals connected to the fixed connection path 5 include, for example, a power terminal, a GND (ground) terminal, a data terminal for transferring, to the basic control module 2, extension setting information stored in the function extension module 3 as described later, etc., and these terminals are at predetermined fixed locations.

The fixed connection path 5 is connected to terminals that are common for all function extension modules 3 connectable to the basic control module 2, and each line of the fixed connection path 5 has its own specific role. Immediately after the power of the information processing apparatus 1 is turned on, first, to transfer the extension setting information to the basic control module 2, power is supplied only to the fixed connection path 5, while the variable connection path 4 is disabled.

The variable connection path 4 is a path for transferring information for controlling the function extension module 3. The variable connection terminals connected to the variable connection path 4 include, for example, as will be described later, a UART terminal, a GPIO terminal, an HDMI (registered trademark) terminal, etc., whose locations may be different among the function extension modules 3.

The extension setting information is information specific to each function extension module 3 and is stored in advance in a nonvolatile memory such as a ROM (Read Only Memory) that is disposed on the function extension module 3 and that is not allowed to be rewritten by the basic control module 2. The extension setting information is information based on which the basic control module 2 is to control the function extension module 3 connected to the basic control module 2 to execute a function of the function extension module 3, and the extension setting information includes, as will be described later, control pin information, control process information, display information, etc.

In the present disclosure, information, for allowing the function extension module 3 to be connected to the basic control module 2 and for enabling the basic control module 2 to execute a function of the function extension module 3, is stored in advance in the function extension module 3. When the function extension module 3 and the basic control module 2 are connected to each other, the power of the information processing apparatus 1 is turned on, and then the extension setting information stored in the function extension module 3 is transmitted to the basic control module 2 via the fixed connection path 5 and thus the basic control module 2 acquires the extension setting information transmitted from the function extension module 3. The basic control module 2 recognizes the pin configuration of the variable connection terminals from the control pin information included in the acquired extension setting information, and sets the variable connection path 4 for transferring the information for controlling the function extension module 3 such that it is possible to transfer information between the basic control module 2 and the function extension module 3 via the variable connection path 4, and changes the setting of each variable connection terminal of the basic control module 2. Thereafter, using control process information or display information included in the acquired extension setting information, the basic control module 2 transfers the information for controlling the function extension module 3 via the set variable connection path and controls the function extension module 3 to execute a particular function. In the present disclosure, the function extension method described above makes it possible to suppress a cost of developing a new program used by the basic control module and suppress an increase in the storage capacity of the basic control module.

The information processing apparatus 1 according to the present disclosure may be, for example, a personal computer, a display apparatus, an image processing apparatus, a communication apparatus, a voice processing apparatus, or the like. FIG. 1B schematically illustrates a configuration of a display apparatus 1a, which is an example of the information processing apparatus 1 according to the present disclosure. In this configuration, a display board module 2a corresponds to the basic control module 2, and an optional board module 3a corresponds to the function extension module 3. The display board module 2a and the optional board module 3a each include a connection connector, and these two modules are connected via a variable connection path 4 and a fixed connection path 5. A ROM corresponding to a storage unit 60 described later is installed on the optional board module 3a, and extension setting information specific to the optional board module 3a is stored in advance in the ROM.

The fixed connection path 5 of the display apparatus 1a includes, for example, a data line 5a, a power line 5b, and a GND line 5c, and these lines are respectively connected fixedly to a data terminal, a power terminal, and a GND terminal. In an initial state after the display board module 2a and the optional board module 3a are connected to each other, the role of each line of the variable connection path 4 is not yet determined. After the display board module 2a acquires extension setting information specific to the optional board module 3a from the optional board module 3a, the display board module 2a recognizes the pin configuration of variable connection terminals of the optional board module 3a from control pin information included in the acquired extension setting information, and the display board module 2a sets locations of variable connection terminals of the display board module 2a and sets the role of each line of the variable connection path 4. In the example shown in FIG. 1B, the variable connection path 4 includes a reset line 4a, a UART line 4b, a GPIO line 4c, and an HDMI line 4d.

After the role of each line of the variable connection path 4 is set in the above-described manner, particular information communication is performed between the display board module 2a and the optional board module 3a via each line of the variable connection path 4, and a function specific to the optional board module 3a is executed.

FIG. 2 is a block diagram illustrating a functional configuration of an information processing apparatus according to an embodiment of the present disclosure. As shown in FIG. 2, the information processing apparatus 1 includes a basic control module 2 and a function extension module 3, and the basic control module 2 and the function extension module 3 are connected to each other via connection connectors (14, 54) provided on the respective modules. The connection connectors (14, 54) of the two modules are connected to each other via the variable connection path 4 and the fixed connection path 5 as described above.

Configuration of Basic Control Module

In FIG. 2, the basic control module 2 of the information processing apparatus 1 includes a control unit 11, an operation unit 12, a display unit 13, a connection connector 14, a power unit 15, a connection detection unit 16, a setting information acquisition unit 17, a variable path setting unit 18, a power supply unit 19, an extension function execution unit 20, and a storage unit 30.

The control unit 11 is a unit that controls an operation of each constituent element such as the operation unit. The control unit 11 is realized by a microcomputer including a CPU, a ROM, a RAM, an I/O controller, a timer, and/or the like. The CPU controls various kinds of hardware to operate in a coordinated fashion based on a control program stored in advance in the ROM or the like thereby achieving a variable path setting function, an extension function execution function, or the like of the present disclosure. In particular, the setting information acquisition unit 17, the variable path setting unit 18, the power supply unit 19, and the extension function execution unit 20 are functional blocks that are realized mainly by software, and the CPU executes operations of these functional blocks based on particular programs.

The operation unit 12 is a unit that inputs information such as characters and/or selects a function. The operation unit 12 is realized, for example, by a keyboard, a mouse, a push-button switch, a touch panel, and/or the like.

The display unit 13 is a unit that displays information. More specifically, information used in executing each function, a result of the execution of each function, or the like are displayed to notify a user. For example, an LCD, an organic EL display, or the like is used as the display unit 13. In a case where a touch panel is used as the operation unit 12, the display unit and the touch panel are disposed in an overlaid fashion.

The connection connector 14 is a connector for connecting the function extension module 3. The connector includes a predetermined number of connection terminals (connection pins). The connection connector 14 of the basic control module corresponds to a first connection connector, and includes first variable connection terminals connected to the variable connection path 4 and first fixed connection terminals connected to the fixed connection path 5. The first fixed connection terminals (fixed pins) include a plurality of terminals whose locations and roles are fixedly set in advance. The first variable connection terminals (variable pins) include a plurality of terminals whose roles are to be set, based on the extension setting information acquired by the setting information acquisition unit 17, to be the same as the roles of the corresponding variable connection terminals (the second variable connection terminals) of the function extension module 3 connected via the variable connection path 4. Each connector may be a connector according to an existing standard. However, the number of terminals and/or the shape of the connector are not limited to those according to existing standards, and specifications of the connector may be according to a special standard.

Regarding the fixed connection terminals (fixed pins) of the connection terminals of the connection connector 14, the number of fixed connection terminals (fixed pins) and locations thereof and the roles of the respective fixed pins are predetermined fixedly. For example, in a case where the number of connection terminals of the connector is ten, the number of fixed pins may be five, and roles such as a power supply pin, a GND pin, and/or the like are assigned in advance to the respective fixed pins and locations thereof are also determined in advance. However, the number of fixed pins, the locations of the fixed pins, and the roles of the respective fixed pins are not limited to those described in the following embodiments.

The power unit 15 is a unit that receives commercial power supplied by an electric power company and outputs particular power to the basic control module 2 and the function extension module 3. The power supply unit 19 is a unit that converts the power output from the power unit 15 to a particular power supply voltage and supplies the particular power supply voltage to the basic control module 2 and the function extension module 3. When the power switch of the information processing apparatus 1 is turned on by a user, the power supply unit 19 supplies power with the particular voltage to each piece of hardware of the basic control module 2. As a result, the whole basic control module 2 goes into an active state.

In a case where the function extension module 3 has been connected to the basic control module 2, power with the particular voltage is supplied to the function extension module 3 via the connection connector 14. However, immediately after the supplying of power to the basic control module 2 is started, the control unit 11 supplies power to the function extension module 3 via the fixed connection path 5 of the connection connector 14, and the control unit 11 performs controlling such that it is allowed to transfer information only via the fixed connection path 5 but it is not allowed to transfer information via the variable connection path 4 of the connection connector 14.

After the setting of the variable connection terminals connected to the variable connection path 4 is completed, power with the particular voltage is supplied from the power supply unit 19 to the basic control module 2 and the function extension module 3 such that it is allowed to transfer information via the variable connection path 4 connected to the variable connection terminals of the connection connector 14.

The connection detection unit 16 is a unit that detects whether the function extension module 3 is connected to the basic control module 2. The detection as to whether the function extension module 3 is connected to the basic control module 2 may be achieved, for example, by periodically issuing a read request from the basic control module 2 to the storage unit 60 of the function extension module 3 via the fixed connection path 5. More specifically, when it is confirmed that a particular response to the read request has been returned from the function extension module 3, it may be determined that the function extension module 3 is connected. On the other hand, in a case where no response to the read request is returned from the function extension module 3 within a specified time period, it may be determined that the function extension module 3 is not connected. Alternatively, based on the fact that power is supplied to the function extension module 3 via a power line of the fixed connection path 5, when a particular current flowing through the power line and the GND line is detected, it may be determined that the function extension module 3 is connected, but in a case where no current flowing is detected, it may be determined that the function extension module 3 is not connected.

In a case where the connection detection unit 16 detects that the function extension module 3 is connected, then, after power is supplied from the power supply unit 19 to the function extension module 3 via the fixed connection path 5, the setting information acquisition unit 17 performs a process to acquire extension setting information stored in the storage unit 60 of the function extension module 3 via a data line of the fixed connection path 5. However, it is not allowed to transfer data via a variable connection terminal until the setting of the variable connection terminals of the basic control module 2 based on the acquired extension setting information is completed, therefore, when it is detected that the function extension module 3 is connected, the power supplied from the power supply unit 19 is given, via the fixed connection path 5, to elements or units of the function extension module 3 including at least the fixed connection terminals (the second fixed connection terminals) connected to the fixed connection path 5, the control unit 51, the storage unit 60 in which the extension setting information is stored, and the setting information transmission unit 52, until the setting information acquisition unit 17 acquires the extension setting information.

The setting information acquisition unit 17 is a unit that acquires (receives) extension setting information transmitted from the setting information transmission unit 52 of the function extension module 3 via the fixed connection path 5. The acquired extension setting information is stored as received setting information in the storage unit 30.

The variable path setting unit 18 is a unit that sets, based on the acquired extension setting information (received setting information), the variable connection path 4 for transferring information for controlling the function extension module 3. That is, the pin configuration of the variable connection terminals of the function extension module 3 is recognized using the control pin information included in the acquired extension setting information, and the roles of the respective variable connection terminals (variable pins) of the connection connector 14 connected to the variable connection path 4 are set such that information can be transferred between the basic control module 2 and the function extension module 3 via the variable connection path 4.

The extension function execution unit 20 is a unit that transfers information for controlling the function extension module 3 via the set variable connection path 4 using the acquired extension setting information thereby executing a particular function specific to the function extension module 3. The execution of the extension function is performed when the information is transferred via the variable connection path 4 after the roles of the variable connection terminals are set based on the control process information and the display information included in the extension setting information.

The storage unit 30 is a unit that stores information and/or a program used in executing one or more functions of the information processing apparatus according to the present disclosure. The storage unit 30 may be realized using a semiconductor storage device such as a ROM, a RAM, a flash memory or the like, a storage apparatus such as an HDD, an SSD, or the like, or other storage mediums. In the storage unit 30, for example, the received setting information 31 is stored. The received setting information 31 may be stored in a nonvolatile storage apparatus such as an HDD or the like, or may be stored in a rewriteable volatile memory device such as a RAM or the like. The received setting information 31 includes control pin information 32, control process information 33, display information 34, and/or the like.

The received setting information 31 corresponds to the extension setting information prestored in the function extension module 3. The control pin information 32 is information associated with the variable connection terminals and the fixed connection terminals of the function extension module 3, and the control pin information 32 defines the locations of the respective pins of the fixed connection terminals and the variable connection terminals, the roles (the functions) of the respective pins, voltage levels, and/or the like. The control process information 33 is information associated with a control executable on the function extension module 3 and includes one or a plurality of control commands expressed in an executable form. The display information 34 is information including a content to be displayed on the display unit 13 when the function extension module 3 is controlled. A user performs a particular input operation using the operation unit 12 while watching the information displayed on the display unit 13 thereby controlling the function extension module 3. Examples of information stored in the storage unit 30 will be described in detail later.

Configuration of Function Extension Module

In FIG. 2, the function extension module 3 of the information processing apparatus 1 includes a control unit 51, a setting information transmission unit 52, an operation execution unit 53, a connection connector 54, and a storage unit 60. It is assumed that the storage unit 60 of the function extension module 3 includes a nonvolatile and non-rewritable storage device such as a ROM, and the extension setting information is stored in this storage device (ROM).

The control unit 51 is a unit that controls operations of respective constituent elements of the function extension module, and is realized by a microcomputer including a CPU, a ROM, a RAM, an I/O controller, a timer, and/or the like. The CPU controls various kinds of hardware to operate in a coordinated fashion based on control programs stored in advance in the ROM or the like thereby executing the function specific to the function extension module. In particular, the control unit 51 of the function extension module executes an operation according to a content of a request received from the basic control module 2. Note that the setting information transmission unit 52 and the operation execution unit 53 are functional blocks which are executed by the CPU according to a particular program.

The setting information transmission unit 52 is a unit that transmits extension setting information 61 stored in the storage unit 60 of the function extension module 3 to the basic control module 2. When power is supplied from the basic control module 2 via the fixed connection path 5, at least the control unit 51, the setting information transmission unit 52, and the ROM in which the extension setting information is stored are brought into a state in which they are operable. In this state, the control unit 51 reads out the extension setting information 61 from the ROM, and the setting information transmission unit 52 transmits the extension setting information 61 to the basic control module 2 using a data line of the fixed connection path 5.

The operation execution unit 53 is a unit that executes a particular function of the function extension module 3. More specifically, the operation execution unit 53 executes a requested function based on command information (referred to as a control command) given by the extension function execution unit 20 of the basic control module 2. For example, in a case where the variable connection terminals of the variable connection path 4 include a reset terminal, for example, when a request to assert the reset terminal is input from the extension function execution unit 20 to perform a process of recovering the function extension module 3 from an abnormal state, the operation execution unit 53 executes an abnormality handling process to initialize the function extension module 3.

In a case where the variable connection terminals of the variable connection path 4 include a UART terminal, for example, when a mode change request signal requesting a change in the UART communication mode performed by the function extension module 3 is input from the extension function execution unit 20, the operation execution unit 53 executes a process to change the UART communication mode of the function extension module 3 to the requested communication mode. Other examples of processes performed by the operation execution unit 53 in response to a request signal input to one of the variable connection terminals of the variable connection path 4 include starting executing a function of the function extension module 3 (by power on), ending a function (by power off) switching a function mode (for example, content playback, stop, etc.), setting a requested operation clock, etc.

The connection connector 54 is a connector for connecting the basic control module 2. The connection connector 54 corresponds to the second connection connector, and includes, as with the connection connector 14 of the basic control module 2, second fixed connection terminals connected to the fixed connection path 5 and second variable connection terminals connected to the variable connection path 4. The locations and the numbers of the respective second fixed connection terminals and the second variable connection terminals are the same as those of the connection connector 14 of the basic control module 2, and the total number of connection terminals is the same as that of the connection connector 14 of the basic control module 2. That is, the variable connection terminals (the second variable connection terminals) of the function extension module 3 are connected to the corresponding variable connection terminals (the first variable connection terminals) of the basic control module 2 via the variable connection path 4, while the fixed connection terminals (the second fixed connection terminals) of the function extension module 3 are connected to the corresponding fixed connection terminals (the first fixed connection terminals) of the basic control module 2 via the fixed connection path 5. Note that the fixed connection terminals and the variable connection terminals of the function extension module 3 include a plurality of terminals whose locations and roles are determined fixedly when the design is made.

The storage unit 60 is a unit that stores information and/or programs used in executing functions of the function extension module 3, and is realized using a semiconductor storage device such as a ROM, a RAM, a flash memory or the like, a storage apparatus such as an HDD, an SSD, or the like, or other storage media. In the storage unit 60, for example, the extension setting information 61 is stored. The extension setting information 61 is information specific to the function extension module 3 as described above, and thus it may be preferable to store the extension setting information 61 in a ROM (Read Only Memory) which is a nonvolatile and non-rewritable memory such that the stored extension setting information 61 is not lost.

The extension setting information 61 includes control pin information 62, control process information 63, display information 64 and/or the like. As already explained in the description of the received setting information 31 associated with the basic control module 2, the control pin information 62 is information associated with the variable connection terminals and the fixed connection terminals of the function extension module 3, and the control pin information 62 defines the locations and the roles (the functions) of the respective fixed connection terminals and the variable connection terminals. The control process information 63 is information defining a content of a control for controlling the function extension module 3 to execute a particular function. The display information 64 is information including a content to be displayed on the display unit 13 when the function extension module 3 is controlled.

However, the contents of the extension setting information 61 are not limited to those described above, but the extension setting information 61 may include other information. For example, the extension setting information 61 may include information indicating a consumption power value of the function extension module 3, the number and types of external connection terminals, information specific to the function extension module 3 such as the version number of the function extension module, the name of the function extension module, the serial number of the function extension module, and/or the like, wherein the information is described in a format that allows the basic control module 2 to analyze the information. The consumption power value of the function extension module 3 is used, as described later, to determine (in a connectability judgment) whether the function extension module 3 is connectable to the basic control module 2.

FIGS. 3A to 3B and FIGS. 4A to 4B illustrate examples of received setting information 31 which is included in the extension setting information 61 prestored in the storage unit 60 of the function extension module 3 in the information processing apparatus 1 and which is acquired by the basic control module 2 and is stored in the storage unit 30. In FIGS. 3A to 3B and FIGS. 4A to 4B, it is assumed that the information processing apparatus 1 is by way of example the display apparatus 1a, wherein the basic control module 2 corresponds to the display board module 2a, and the function extension module 3 corresponds to the optional board module 3a.

FIGS. 3A to 3C illustrate examples of control pin information 62 included in the extension setting information 61 for two types of function extension modules 3, that is, an optional device A and an optional device B.

In the examples shown in FIGS. 3A to 3C, it is assumed that the total number of connection terminals of the connection connector is 10, the number of variable connection terminals connected to the variable connection path 4 is 5, and the number of fixed connection terminals connected to the fixed connection path 5 is 5. The variable connection terminals of the connection connector are at locations assigned terminal numbers 2, 3, 4, 5, and 6, while the fixed connection terminals of the connection connector are at locations assigned terminal numbers 1, 7, 8, 9, and 10. The definitions, that is, the roles of the respective fixed connection terminals are the same for both optional devices. However, in the optional device B, the terminal of the terminal number 8 is not used.

In FIGS. 3A to 3C, in the control pin information 62, six pieces of information are set in advance for each terminal number. That is, the control pin information 62 includes information indicating a function, information indicating whether it is allowed to change the setting, information indicating an input/output direction, information indicating a voltage level, information indicating a GPIO logic, and information indicating a GPIO signal type. GPIO stands for General Purpose Input/Output. The input/output direction indicates a direction in which a signal flows as seen from the optional device. More specifically, IN indicates that a signal output from the basic control module 2 is input to the optional device, while OUT indicates that a signal is output from the optional device to the basic control module 2. The setting change enable/disable information is information indicating whether it is allowed to change the definition of the corresponding connection terminal. When the setting change enable/disable information has a value corresponding to a symbol "o", it is allowed to change the definition, that is, the terminal is a variable connection terminal.

The fixed connection terminals of the connection connector assigned the terminal numbers 1, 7, 8, 9, and 10 are assigned the same functions for both the optional device A and the optional device B. More specifically, they respectively function as a "power" terminal, an "I2C data" terminal, an "I2C clock" terminal, an "I2C power supply" terminal, and a "GND" terminal. The "power" terminal, the "I2C clock" terminal, and the "I2C power supply" terminal are assigned IN as the input/output direction, that is, the direction from the basic control module 2 to the optional device. The "I2C data" terminal is a terminal that allows data to be transferred in both the IN direction and the OUT direction. Using this "I2C data" terminal of the fixed connection terminals, the extension setting information 61 prestored in the storage unit 60 of the function extension module 3 is transferred to the basic control module 2.

On the other hand, the variable connection terminals of the connection connector assigned the terminal numbers 2, 3, 4, 5, and 6 are different in definition (function) between the optional device A and the optional device B. In the optional device A, the variable connection terminals assigned the terminal numbers 2, 3, 4, 5, and 6 respectively function as a "reset" terminal, an "ON" terminal, an "ON completion" terminal, a "UART" terminal, and a "UART" terminal. The variable connection terminals assigned terminal numbers 5 and 6 are both UART terminals with a voltage level of 5 V. However, the input/output direction is different between these two variable connection terminals. The voltage level is 3.3 V for the "reset" terminal, the "ON" terminal, and the "ON completion" terminal. The GPIO logic is a negative logic for the "reset" terminal and "ON" terminal, while the GPIO logic is a positive logic for the "ON completion" terminal. The GPIO signal type is "level" for the "reset" terminal and "ON completion" terminal, while the GPIO signal type is "pulse" for the "ON" terminal.

In the optional device B, the variable connection terminals assigned the terminal numbers 2, 3, 4, 5, and 6 respectively function as an "OFF" terminal, an "ON" terminal, a "error state" terminal, an "I2C data 2" terminal, and an "I2C clock 2" terminal. In both the "OFF" terminal and the "ON" terminal respectively assigned terminal numbers 2 and 3, the input/output direction is "IN", the voltage level is 3.3 V, the GPIO logic is the negative logic, and the GPIO signal type is "level". In the "error state" terminal with the terminal number 4, the input/output direction is "OUT", the voltage level is 3.3 V, the GPIO logic is the negative logic, and the GPIO signal type is "level".

The voltage level is 3.3 V for both the "I2C data 2" terminal and the "I2C clock 2" terminal. However, the input/output direction is "IN" for the "I2C clock 2" terminal assigned the terminal number 6, while both "IN" and "OUT" are allowed as the data transfer direction for the "I2C data 2" terminal assigned the terminal number 5. In the optional device B, after the roles of the variable connection terminals of the basic control module 2 are set, data is transferred using the "I2C data 2" terminal and the "I2C clock 2" terminal assigned the terminal numbers 5 and 6.

The control pin information 62 such as that described above is transmitted from the function extension module 3 to the basic control module 2 via the fixed connection path 5, and stored in the storage unit 30 of the basic control module 2. The variable path setting unit 18 of the basic control module 2 sets the roles of the variable connection terminals of the connection connector 14 based on the acquired control pin information 62. As can be seen from FIGS. 3A to 3C, the roles of the variable connection terminals of the connection connector 14 vary depending on the optional device (A, B) connected to the basic control module 2, and thus the roles of the variable connection terminals of the connection connector 14 are set depending on the connected optional device.

FIGS. 4A to 4C illustrate examples of control process information 63 and display information 64 included in the extension setting information 61 for two optional devices, that is, the optional device A and the optional device B. The control process information 63 shown in FIGS. 4A to 4C includes four control commands (power on, abnormality handle, operation mode change, and power off) for controlling the optional device. The contents of the four control commands are merely examples, and the contents of the control commands are not limited to these examples and other control commands may be set in advance for each optional device.

A control command #1 is a power-on command to turn on power of the optional device such that the optional device goes into an operable state. A control command #2 is an abnormality handling command to forcedly return (reset) the optional device to a normal state when the optional device gets into an abnormal state. A control command #3 is an operation mode change command to change an operation mode of the function specific to the optional device. A control command #4 is a power-off command to turn off the power of the optional device thereby stopping the operation of the optional device. The control process information 63 including the four control commands described above is transmitted to the basic control module 2 from the function extension module 3 (the optional device A or the optional device B) connected to the basic control module 2 via the fixed connection path 5, and is stored in the storage unit 30 of the basic control module 2.

The four control commands for controlling the optional device each include one or more processes to be executed by the extension function execution unit 20 of the basic control module 2. The roles of the variable connection terminals of the connection connector 14 vary depending on the connected optional device, and thus the processes of each control command may be different depending on whether the connected optional device is the optional device A or the optional device B. The processes are shown in the form of a list in FIGS. 4A and 4B.

For example, the function of the power-on command of the control command #1 is the same for both the optional device A and the optional device B, but the detailed process thereof (shown in the list) are different between the optional device A and the optional device B. The power-on command for the optional device A includes three processes (as described in the list), while the power-on command for the optional device B includes five processes (as described in the list). That is, to turn on the power of the optional device A, the extension function execution unit 20 performs sequential processes including first transmitting a power-on request signal to the optional device A, waiting for 100 ms, and then negating the reset terminal assigned the terminal number 2.

To turn on the power of the optional device B, the extension function execution unit 20 first transmits a power-on request signal to the optional device B, waits for 1000 ms, and then sets the "I2C data 2" terminal and the "I2C clock 2" terminal respectively assigned the terminal numbers 5 and 6 to 400 kHz. Thereafter, three pieces of command data 0x35, 0x20, and 0x01 are applied to the "I2C data 2" terminal and these three pieces of command data are transmitted to the optional device B sequentially in this order. Thereafter, a confirmation is made as to whether 0xee, which is to be transmitted from the optional device B in response to these pieces of command data, is actually transmitted from the optional device B and received at the "I2C data 2" terminal. When the confirmation on the reception of the data is completed, the sequential processes associated with the turning-on of power are ended.

As described above, the control command #1 for turning on power has a different content of processing depending on the connected optional device. The control command #2 for abnormality handling, the control command #3 for changing the operation mode, and the control command #4 for the power off are also different in content of processing depending on the connected optional device although the function is the same.

FIG. 4C shows items of the display information 64 which is displayed on the display unit 13 when the optional device A is controlled. In a case where there is no items to be displayed on the display unit 13, there may not be display information 64. For example, when the optional device B is controlled, if there is no items to be displayed on the display unit 13, the extension setting information 61 associated with the optional device B includes no display information 64. In the example shown in FIG. 4C, the display information 64 includes item names of OSD. An item name "Power Control" is displayed when the power-on command described above is executed, and an item name "Reset" is displayed when the abnormality handling command described above is executed.

The content of the display information 64 is not limited to the OSD item names described above, but various display items may be set for each optional device. The display information 64 is transmitted from the connected function extension module 3 (the optional device A or the optional device B) to the basic control module 2 via the fixed connection path 5 and is stored in the storage unit 30 of the basic control module 2.

When an optional device is connected to the basic control module 2, the extension setting information 61 including the three pieces of information described above is transmitted to the basic control module 2 from the optional device and is stored as received setting information 31 in the storage unit 30 of the basic control module 2. The control process information 63 and the display information 64, which are control commands for controlling the operation of the optional device, are given from the optional device to the basic control module 2 when the optional device is connected to the basic control module 2, and thus the control process information 63 and the display information 64 may not be stored in advance in the basic control module 2.

In particular, in a case where there are many optional devices selectively connectable to the basic control module 2, the control process information 63 and the display information 64 for controlling all of many optional devices may not be stored in advance in the storage unit 30 of the basic control module 2, which makes it possible to reduce the storage capacity of the basic control module 2. The control unit 11 of the basic control module 2 may have only a function (for example, an interpreter function) of interpreting and executing a control command for controlling an operation of an optional device, but different many control programs for controlling the respective optional devices may not be developed and stored in the storage unit 30. In each optional device, a control command (control process information 63) and/or display information 64 generated in a form interpretable by the control unit 11 may be stored in advance in the storage unit 60.

Control Processing by Basic Control Module

Figure 5:
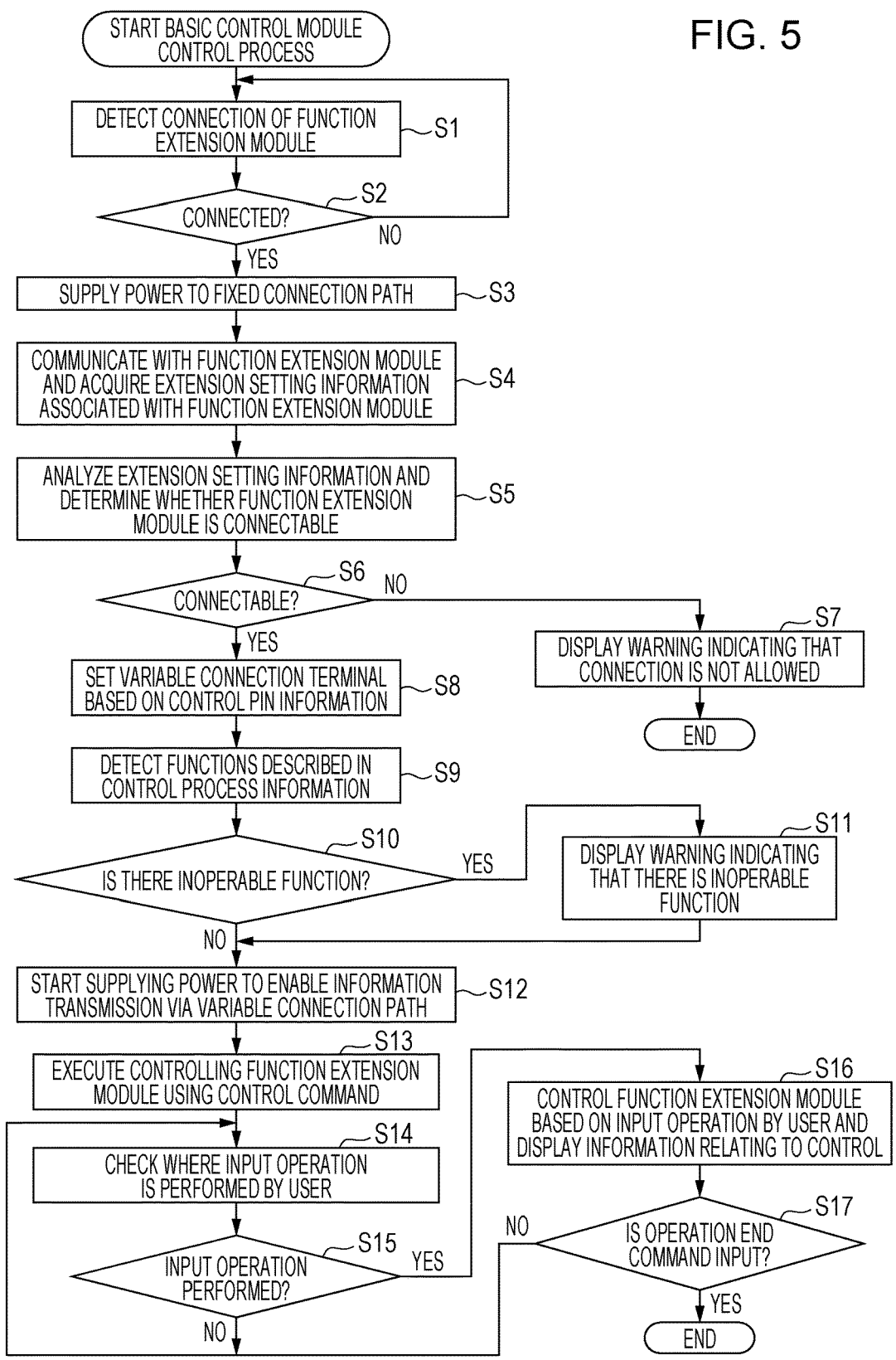
FIG. 5 is flow chart illustrating a control process in a basic control module of an information processing apparatus according to an embodiment of the present disclosure.

FIG. 5 illustrates a flow chart of a control process performed in the basic control module of the information processing apparatus 1 according to an embodiment. When power is supplied to the information processing apparatus 1, the power unit 15 of the basic control module 2 provides power with a particular voltage to hardware of the basic control module 2. As a result, each functional block of the basic control module 2 is brought into a state in which it is allowed to start an operation of the functional block.

In step S1 in FIG. 5, the connection detection unit 16 of the basic control module 2 detects whether a function extension module 3 is connected to the basic control module 2. In a case where it is detected in step S2 that a function extension module 3 is connected to the basic control module 2, the processing flow proceeds to step S3, but otherwise the processing flow returns to step S1.

In step S3, the power supply unit 19 supplies power with a particular voltage to the power line 5b of the fixed connection path 5 connected to the fixed connection terminals of the connection connector 14. As a result, the power with the particular voltage is supplied to specific hardware blocks of the function extension module 3 via the power line 5b of the fixed connection path 5, and thus it becomes possible to communicate with the function extension module 3 via the data line 5a of the fixed connection path 5. In particular, the power with particular voltage is supplied to the function extension module 3 such that the control unit 51, the setting information transmission unit 52, and the storage unit 60 of the function extension module 3 become operable.

In step S4, the setting information acquisition unit 17 communicates with the function extension module 3 and acquires the extension setting information 61 stored in the function extension module 3. For example, the basic control module 2 transmits extension setting information acquisition request data to the function extension module 3 via the data line 5a of the fixed connection path 5. On receiving the acquisition request data, the function extension module 3 reads out the extension setting information 61 from the storage unit 60 and transmits the extension setting information 61 to the basic control module 2 via the data line 5a. The acquired extension setting information 61 is stored as received setting information 31 in the storage unit 30.

In step S5, the acquired extension setting information (the received setting information 31) is analyzed and a determination is made as to whether the function extension module 3 is connectable. For example, in a case where the received setting information 31 includes a consumption power value of the function extension module 3, the connectability is judged based on the consumption power value. In a case where the consumption power value of the function extension module 3 is larger than a maximum allowable value that the basic control module 2 can handle, it is determined that this function extension module 3 is unconnectable. In a case where the consumption power value of the function extension module 3 is smaller than or equal to the maximum allowable value that the basic control module 2 can handle, it is determined that this function extension module 3 is connectable. Alternatively, the connectability of the function extension module 3 may be judged based on a version number. In a case where the version number is within a range that the basic control module can handle, it is determined that the function extension module 3 is connectable, but in a case where the version number is out of the range that the basic control module can handle, it is determined that the function extension module 3 is unconnectable.

In a case where it is determined in step S6 that the function extension module 3 is connectable, the processing flow proceeds to step S8, but in a case where it is determined that the function extension module 3 is unconnectable, the processing flow proceeds to step S7. In step S7, to notify a user of the unconnectability of the function extension module 3, for example, a warning message indicating the unconnectability is displayed on the display unit 13, and the process is ended.

In step S8, the variable path setting unit 18 sets the variable connection terminals based on control pin information 32 included in the stored received setting information 31. For example, based on control pin information 32 such as that shown in FIGS. 3A to 3C, functions are assigned to the respective variable connection terminals, and the input/output direction, the voltage level, and/or the like are set. In step S9, functions to be executed on the function extension module 3 are determined based on processes specified by a control command corresponding to the control process information 33 included in the stored received setting information 31, and it is checked whether the determined functions to be executed include a function that cannot be operated by the basic control module 2. In a case where it is determined in step S10 that the determined functions include a function that cannot be operated by the basic control module 2, the processing flow proceeds to step S11, but otherwise the processing flow proceeds to step S12.

For example, let it be assumed that the connected function extension module 3 includes terminals according to the USB standard, but the basic control module 2 does not have a function of transmitting/receiving a signal according to the USB standard. In this case, because the variable connection terminals of the connected function extension module 3 includes terminals according to the USB standard, the function extension module 3 is capable of transmitting/receiving a signal according to the USB standard via these variable connection terminals. However, the basic control module 2 does not have the function of transmitting/receiving the signal according to the USB standard, and thus the basic control module 2 is not capable of performing a communication using the variable connection terminals, and thus it is determined that the determined functions include a function that cannot be operated by the basic control module 2. In step S11, to notify a user that the functions of the function extension module 3 include an inoperable function, for example, a warning message indicating that there is an inoperable function and a content of the inoperable function is displayed on the display unit 13. Thereafter, the processing flow proceeds to step S12.

In step S12, the power supply unit 19 starts supplying power with the particular voltage to the function extension module 3 such that it becomes possible to perform information transmission via the variable connection path 4. In step S13, the extension function execution unit 20 controls the function extension module 3 to perform a particular control using a control command corresponding to the control process information 33 included in the stored received setting information 31. For example, the control command 1 shown in FIG. 4A or 4B is read out, and the power-on function is executed on the function extension module 3. Note that the above-described control on the function extension module 3 is performed using the extension setting information 61 prestored in the connected function extension module 3, and thus the control can be performed without changing the control program prestored in the basic control module 2 and without further storing any additional control program in the basic control module 2.

In step S14, it is checked whether a user has performed a particular input operation using the operation unit 12. In a case where it is determined in step S15 that the input operation has been performed by the user, the processing flow proceeds to step S16, but otherwise the processing flow returns to step S14. In step S16, in response to the input operation performed by the user, controlling and displaying corresponding to the input operation are executed on the function extension module 3.

For example, when an input operation for checking an operation state of the function extension module 3 is performed, particular information is transmitted to the function extension module 3 based on a control command for checking the operation state. When information indicating the operation state of the function extension module 3 is acquired from the function extension module 3, the information indicating the operation state is displayed on the display unit 13.

In a case where an input operation for turning off the power supply of the information processing apparatus is performed, particular information is transmitted to the function extension module 3 based on a power-off command. When particular response information is received from the function extension module 3, operations of the basic control module 2 and the function extension module 3 are stopped.

In a case where it is determined in step S17 that an input operation to end the operation of the information processing apparatus is not performed by the user, the processing flow returns to step S14 to continue the process. In a case where an input operation to end the operation of the information processing apparatus is performed, the process is ended.

As described above, the basic control module 2 provided in the information processing apparatus 1 acquires the extension setting information 61 from the function extension module 3, sets the variable connection terminals based on the control pin information included in the acquired extension setting information, and then controls the function extension module 3 based on the control process information, display information, and/or the display information included in the acquired extension setting information, and thus, to use a new additional function by adding a function extension module 3 to the information processing apparatus 1, it is possible to easily make it possible to use the new addition function simply by connecting the function extension module 3 to the basic control module 2 without developing a new program for controlling the function extension module 3 and storing the developed program in the basic control module 2, which allows it to reduce a developing cost to achieve the connectability of the function extension module 3 and reduce the storage capacity of the basic control module 2.

Summary of Embodiments

First Embodiment

In the present disclosure, the extension setting information 61 is stored in advance in the storage unit 60 of the function extension module 3. The extension setting information 61 includes at least the control pin information 62 and the control process information 63. To notify a user of an operation state or the like of the function extension module or to prompt a user to perform a particular input operation for setting, the extension setting information 61 may include the display information 64.

Second Embodiment

The fixed connection path 5 connected to the fixed connection terminals may include at least the power line, the GND line, and the data line.

Third Embodiment

The variable connection path 4 connected to the variable connection terminal may include, for example, the reset line, the GPIO line, and the control signal line. The control signal line is a line for transmitting/receiving a control signal according to a particular standard, for example, a line for transmitting/receiving signal according to a UART, HDMI, USB, or the like may be provided as the control signal line.

Fourth Embodiment

The control pin information 62 may include properties of each connection terminal in terms of, for example, a terminal number, a function, a setting change enable/disable information, an input/output direction, a voltage level, a GPIO logic, and a GPIO signal type. However, the content of the control pin information 62 is not limited to the properties described above, but the control pin information 62 may include other information specific to the information processing apparatus.

Fifth Embodiment

The control process information 63 may include control commands, for example, a power-on command, a power-off command, an abnormality handling command, an operation mode change command, and/or the like. However, the control commands are not limited to these examples, but one or more special control commands may be defined for each function extension module 3. Further examples of control commands included in the control process information 63 are a command to transmit information to the function extension module, a command to receive data in response a transmission command, a command to acquire an operation mode, a command to transmit a request signal to change an operation mode, a command to update built-in firmware, and/or the like.

Sixth Embodiment

The display information 64 may include items of information to be displayed on the display unit 13. More specifically, for example, the display information 64 may include a current operation state of the function extension module, a setting content, a list of optional items selectable by a user in an input operation, and/or the like. Still further examples are identification information such as a name uniquely assigned to the function extension module, a product serial number, and/or the like.

The present disclosure contains subject matter related to that disclosed in Japanese Priority Patent Application JP 2017-238933 filed in the Japan Patent Office on Dec. 13, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising a basic control module and a function extension module,
    the function extension module comprising:
        a storage unit in which extension setting information for enabling the basic control module to control the function extension module to execute a function of the function extension module is stored in advance; and
    a setting information transmission unit that transmits the extension setting information to the basic control module,
    the basic control module comprising:
        a setting information acquisition unit that acquires the extension setting information transmitted by the setting information transmission unit of the function extension module;
        a variable path setting unit that sets, based on the acquired extension setting information, a variable connection path via which to transfer information for controlling the function extension module; and
        an extension function execution unit that transfers the information for controlling the function extension module via the set variable connection path using the acquired extension setting information and to control the function extension module to execute a particular function.

2. The information processing apparatus according to claim 1, wherein
    the basic control module and the function extension module are connected to each other via the variable connection path and a fixed connection path,
    the basic control module comprises a first connection connector, the first connection connector including a first variable connection terminal connected to the variable connection path, and a first fixed connection terminal connected to the fixed connection path,
    the function extension module comprises a second connection connector, the second connection connector including a second variable connection terminal connected to the variable connection path and a second fixed connection terminal connected to the fixed connection path,
    the first variable connection terminal and the second variable connection terminal are connected to each other via the variable connection path,
    the first fixed connection terminal and the second fixed connection terminal are connected to each other via the fixed connection path,
    the first fixed connection terminal and the second fixed connection terminal each include a plurality of terminals whose locations and roles are fixedly set in advance, and
    the first variable connection terminal includes a plurality of terminals whose roles are respectively set, based on the extension setting information acquired by the setting information acquisition unit, so as to be the same as roles of the corresponding second variable connection terminals connected via the variable connection path.

3. The information processing apparatus according to claim 2, wherein the extension setting information includes control pin information defining a location and a role of each second variable connection terminal and each second fixed connection terminal of the function extension module, and control process information defining a control content for controlling the function extension module to execute the particular function.

4. The information processing apparatus according to claim 2, wherein the fixed connection path includes a power line via which to supply power from the basic control module to the function extension module, a GND line, and a data line via which to bidirectionally transfer information, wherein the power line, the GND line, and the data line are respectively connected to first fixed connection terminals and second fixed connection terminals at predetermined locations.

5. The information processing apparatus according to claim 4, wherein the basic control module further includes a connection detection unit that detects that the function extension module is connected to the basic control module, and a power supply unit that supplies power to the basic control module and the function extension module, wherein in a case where the connection detection unit detects that the function extension module is connected, the power supply unit supplies power to the function extension module via the fixed connection path, and thereafter the setting information acquisition unit acquires the extension setting information stored in the storage unit of the function extension module via the data line of the fixed connection path.

6. The information processing apparatus according to claim 5, wherein in a case where the connection detection unit detects that the function extension module is connected, the power supplied from the power supply unit is given to elements of the function extension module via the fixed connection path until the setting information acquisition unit acquires the extension setting information, the elements including at least the second fixed connection terminal connected to the fixed connection path, the storage unit in which the extension setting information is stored, and the setting information transmission unit.

7. The information processing apparatus according to claim 1, wherein the storage unit includes a read only memory and the extension setting information is stored in advance in the read only memory.

8. A method of extending a function of an information processing apparatus including a basic control module and a function extension module, the method comprising:

storing, in the function extension module, extension setting information for enabling the basic control module to execute a function of the function extension module;

transmitting the stored extension setting information to the basic control module, in a case where the basic control module and the function extension module are connected to each other;

acquiring the transmitted extension setting information to the basic control module;

setting, based on the acquired extension setting information, a variable connection path via which to transfer information for controlling the function extension module; and transferring the information for controlling the function extension module via the set variable connection path using the acquired extension setting information and making the function extension module execute a particular function.

* * * * *